United States Patent [19]

Gross

[11] Patent Number: 5,064,223

[45] Date of Patent: Nov. 12, 1991

[54] THROTTLE MODULATOR ASSEMBLIES AND THERMOPLASTIC FLUID DIRECTION TUBES FOR INSERTION THEREIN

[75] Inventor: Todd A. Gross, Dearborn Heights, Mich.

[73] Assignee: Ford Motor Company, Dearborn, Mich.

[21] Appl. No.: 418,426

[22] Filed: Oct. 6, 1989

[51] Int. Cl.$^5$ ............................................. F16L 35/00
[52] U.S. Cl. .................................... 285/93; 285/238; 285/382; 285/187; 123/590; 261/65
[58] Field of Search ................. 285/93, 382, 238, 187, 285/174; 29/525, 450; 261/65; 123/572, 573, 585, 586, 587, 588, 590

[56] References Cited

U.S. PATENT DOCUMENTS

| Re. 25,062 | 10/1961 | Phillips . | |
|---|---|---|---|
| 2,326,292 | 8/1943 | Dorman . | |
| 2,453,669 | 11/1948 | Meneses . | |
| 2,776,151 | 1/1957 | Harkenrider . | |
| 2,831,711 | 4/1958 | Leadbetter . | |
| 2,979,050 | 4/1961 | Costello . | |
| 3,023,033 | 2/1962 | Koch . | |
| 3,279,532 | 10/1966 | Pfeil . | |
| 3,447,820 | 6/1969 | Durnan | 285/382 X |
| 3,466,066 | 9/1969 | Dawson . | |
| 3,563,574 | 2/1971 | Jackson . | |
| 3,612,584 | 10/1971 | Taylor . | |
| 3,826,523 | 7/1974 | Eschbaugh . | |
| 3,858,913 | 1/1975 | Gallagher . | |
| 3,940,168 | 2/1976 | Balon | 285/382 X |
| 3,976,314 | 8/1976 | Graham . | |
| 4,097,076 | 6/1978 | Wackenreuther . | |
| 4,123,091 | 10/1978 | Cosentino . | |
| 4,128,264 | 12/1978 | Oldford | 285/238 X |
| 4,171,832 | 10/1979 | Metcalfe . | |
| 4,193,616 | 3/1980 | Sarson . | |
| 4,252,349 | 2/1961 | Mahoff | 285/423 X |
| 4,275,700 | 6/1981 | Graham | 261/65 |
| 4,310,184 | 1/1982 | Campbell | 285/382 X |
| 4,616,856 | 10/1986 | Kowalyshen | 285/238 X |
| 4,728,076 | 3/1988 | Ganshorn . | |
| 4,756,558 | 7/1988 | Beamer . | |
| 4,769,892 | 9/1988 | Kneller | 29/525 X |
| 4,781,400 | 11/1988 | Cunningham . | |

FOREIGN PATENT DOCUMENTS

| 152083 | 7/1950 | Australia | 285/238 |
|---|---|---|---|
| 36345 | 4/1981 | Japan | 29/525 |

Primary Examiner—Dave W. Arola
Attorney, Agent, or Firm—Roger L. May; Damian Porcari

[57] ABSTRACT

An improved throttle modulator assembly and a thermoplastic fluid direction tube for insertion into a throttle modulator assembly are disclosed. The thermoplastic fluid direction tube is annular and hollow and is made from a thermoplastic material having a coefficient of thermal expansion about the same as the throttle modulator body. Further, an annular press ring and at least one associated press wing extending axially therefrom are located along the longitudinal dimension of the end tube portion of the thermoplastic tube.

20 Claims, 1 Drawing Sheet

THROTTLE MODULATOR ASSEMBLIES AND THERMOPLASTIC FLUID DIRECTION TUBES FOR INSERTION THEREIN

BACKGROUND OF THE INVENTION

The present invention generally relates to throttle modulator assemblies and thermoplastic fluid direction tubes for insertion in such assemblies.

A common problem experienced in the automotive industry is the cracking of the aluminum or plastic EFI throttle modulator assemblies resulting from the high pressure required to insert steel fluid direction tubes, such as air by-pass tubes, into the assemblies. Furthermore, not all of the resulting cracks can be detected thus leaving a structural deformity and potential hazard in the automobile.

The use of steel fluid direction tubes in EFI throttle modulator assemblies has been extensive and is well known in the art. However, as mentioned above, the use of steel insertion tubes for throttle modulators in the automotive industry may cause undetectable cracking resulting from the high pressure required for insertion and retention. It is estimated that there may be a 3-5% failure rate involved as a result of pressure insertion of the steel tubes.

Another cause for concern is functional field failures due to the relative coefficients of thermal expansions between steel and aluminum or plastic. More specifically, steel expands at about half the rate of aluminum or plastic. Consequently, under high temperature conditions, the aluminum or plastic throttle modulator expands more quickly than the inserted steel tubes, causing a loss of tube retention in the body of the throttle modulator. This loss of retention at elevated temperatures can produce field failures from tubes falling out of modulator body due to the vibration encountered in automobile use.

Other problems may occur during the installation of the tubes regardless of whether they are made from steel or any other material. In particular, improper orientation and improper location of the insertion tubes often result upon installation into the throttle modulator assemblies. This problem is also known in other unrelated art areas and has resulted in the use of sealing rings, flanges or other devices to assure a tight fit. See, for example Costello U.S. Pat. No. 2,979,050 which discloses a header assembly for space heaters wherein exhaust tubes are retained within a plate by virtue of the exhaust tube's rib and flanged end and Pfeil U.S. Pat. No. 3,279,532 which discloses a heat exchanger wherein the tubes are retained in proper position within support plates by the use of an O-ring and a flared outer end. See also the U.S. Patents to Cunningham (U.S. Pat. No. 4,781,400), and Meneses (U.S. Pat. No. 2,453,669) which disclose tubular coupling assemblies having at least one annular bead or ring for facilitating the joining of a tube to the coupling. The use of an annular bead or O-ring provides uniformity for longitudinal insertion but does not always alleviate the improper orientation and location problems incurred during the installation.

Although thermoplastic tubes of various types have been used previously, as far as is known, they have never been used in the automotive industry for insertion into EFI throttle modulator assemblies. Representative of plastic tubing for other uses include the U.S. Patents to Jackson (U.S. Pat. No. 3,563,574) and Dorman (U.S. Pat. No. 2,326,292), both of which generally involve insertion of a thermoplastic tube into a metal assembly. But, neither of these patents recognize the particular problems associated with EFI throttle modulator assemblies.

Accordingly, there is a need for a thermoplastic fluid direction tube which alleviates the undetectable structural fracturing pattern associated with EFI throttle modulator assemblies. There also remains a need for a thermoplastic fluid direction tube which is easily and inexpensively manufactured and which reduces the occurrence of improper orientation and location of the tube during installation.

SUMMARY OF THE INVENTION

The present invention provides a thermoplastic fluid direction tube and a throttle modulator assembly designed to satisfy the aforementioned needs.

The thermoplastic fluid direction tube of the present invention is preferably used for insertion into EFI throttle modulators commonly found in the automotive industry. The thermoplastic fluid direction tube has as the major component thereof a thermoplastic annular and hollow tube made from a thermoplastic material having a coefficient of thermal expansion about the same as that of the throttle modulator body, which is preferably aluminum. Thus, the preferred coefficient of expansion is about 2.5 m/m/°C. at a temperature range from about $-40°$ to about $140°$ C. The preferred thermoplastic materials include mineral/glass reinforced ones such as glass-reinforced thermoplastic polyester resins and glass-reinforced polyetherimide resins.

An annular press ring which is made from the aforementioned thermoplastic material is located around the thermoplastic tube at a spaced point on the end tube portion thereof, i.e. the end of the tube designed to be inserted into the throttle modulator body. Further, at least one press wing and preferably two press wings extend axially beyond the press ring and along the longitudinal dimension of the thermoplastic tube. The thermoplastic fluid direction tube also preferably has an angular bend, such as a 90° bend following the press wings, followed by a discharge tube portion having a hose connector at the end thereof. The thermoplastic fluid direction tubes are relatively easily and inexpensively molded in one piece using conventional injection molding techniques. The present thermoplastic fluid direction tube of the preferred embodiment offers a considerable cost savings over conventional steel air by-pass tubes.

The throttle modulator assembly of the present invention has at least one thermoplastic fluid direction tube pressure fit into a bore in the body of the throttle modulator. Preferably that bore has a chamfer in it so that the thermoplastic fluid direction tube, which has a corresponding chamfer on it, is brought into alignment during insertion into the bore. It is also desirable that the outside diameter of the thermoplastic fluid direction tube be slightly larger than the diameter of the bore so that an air tight pressure fit is obtained.

With this arrangement good tube retention is assured at all operating temperatures. Because the coefficient of thermal expansion is about the same as the throttle modulator, which is preferably aluminum, there will not be any substantial differential in expansion/contraction. Therefore the tightness of the pressure fit will remain relatively constant. In fact, tests have shown that efforts to remove the thermoplastic fluid direction tube of the preferred embodiment from the bore at various temperatures results in the tube breaking before removal.

Likewise, if the insertion pressure is too great or there is a misalignment (both of which are unlikely with the preferred modulator assembly method of the present invention) the thermoplastic fluid direction tube again breaks before the throttle modulator body is cracked. Because a broken fluid direction tube is more easily detected than a cracked throttle modulator body, this, too, is an advantage of the present invention.

Accordingly, it is an object of the present invention to provide a thermoplastic fluid direction tube which minimizes the occurrence of undetectable structural fractures resulting from the installation of the fluid direction tube in throttle modulator assemblies. It is also an object of the present invention to provide an improved throttle modulator assembly having at least one thermoplastic fluid direction tube inserted therein. Other objects and advantages of the present invention will be apparent from the following description, the accompanying drawings and the appended claims.

DETAILED DESCRIPTION OF THE PREFERRED EMBODIMENT

Figure 1:
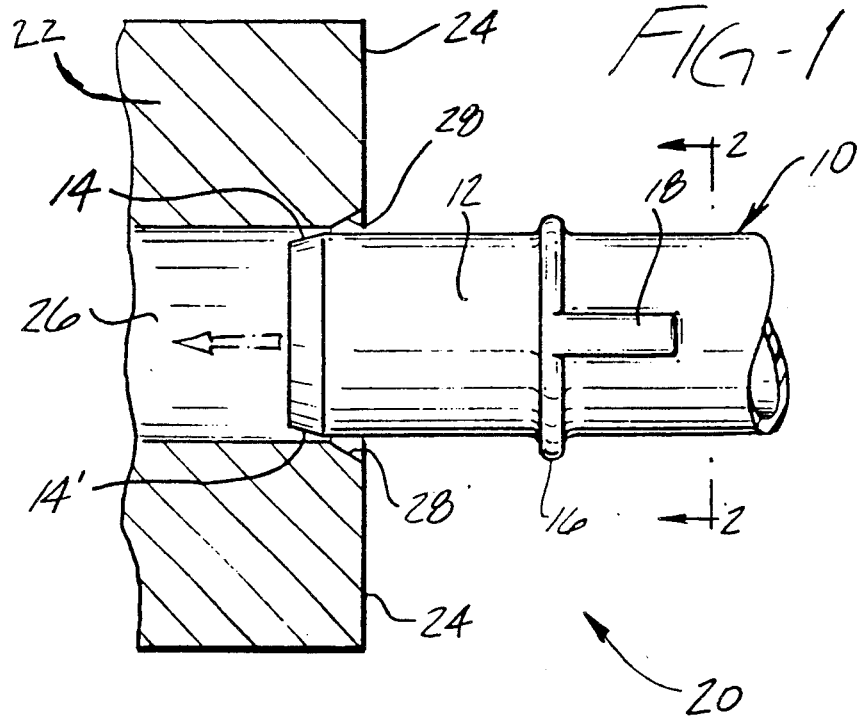
FIG. 1 is a side view of the thermoplastic fluid direction tube about to be inserted into an EFI throttle modulator body to form the throttle modulator assembly.
Figure 2:
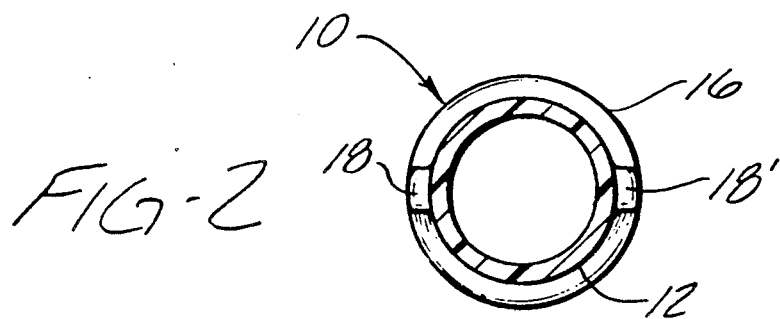
FIG. 2 is a cross-sectional view of the thermoplastic fluid direction tube taken along lines 2—2 of FIG. 1.
Figure 3:
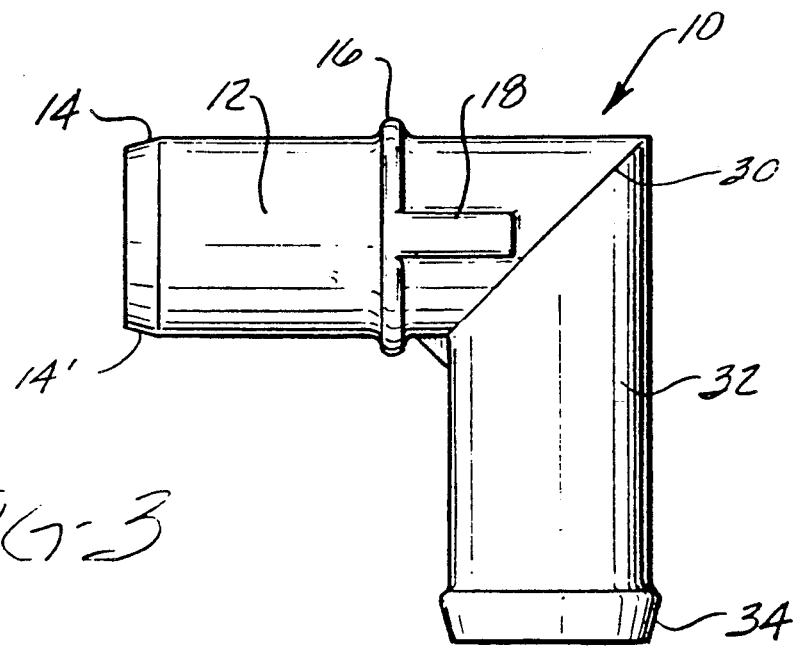
FIG. 3 is a side plan view of the thermoplastic fluid direction tube of the present invention.

Reference is made to FIG. 1 of the drawings which illustrate a throttle modulator assembly such as an aluminum EFI throttle modulator assembly having at least one thermoplastic fluid direction tube therein and FIGS. 2-3 which illustrate in more detail the thermoplastic fluid direction tube, generally designated 10, comprising a preferred embodiment of the present invention.

Referring specifically to FIG. 1, a throttle modulator assembly 20 having a body 22 with wall 24 and at least one bore 26 therein is ready for receiving the thermoplastic fluid direction tube 10 which is preferably an air by-pass tube. The novel design features of the present invention are intended to alleviate problems such as improper orientations and improper location or positioning of thermoplastic fluid direction tube 10 resulting from installation into bore 26. More specifically bore 26 has a chamfer 28—28' formed in wall 24. End tube portion 12 of the thermoplastic fluid direction tube 10 has a corresponding chamfer 14—14' formed on it. The matched chamfers 28—28' and 14—14' help assure exact alignment of the thermoplastic air by-pass tube 10 with bore 26 during insertion.

Press ring 16 is an annular thermoplastic molding located around the annular and hollow thermoplastic tube at a spaced point along end tube portion 12. The press ring 16 provides control over the longitudinal dimension of the insertion into bore 26. Also, at least one and preferably two press wings 18 and 18' are associated with press ring 16. The press wings 18 and 18' extend axially beyond press ring 16 and along the longitudinal dimension of thermoplastic fluid direction tube 10 behind press ring 16 and tube end portion 12. Press wings 18 and 18' along with press ring 16 act together during installation to reduce improper orientation of the thermoplastic fluid direction tube 10. Press wings 18 and 18' are especially preferable when the thermoplastic fluid direction tube 10 includes an angular bend, such as the 90 degree bend 30 shown, for the purpose of directing flow of automotive fluids from the discharge tube portion 32, toward other parts of the engine. Hose connection 34 is formed at the end of discharge tube portion 32 for attachment of a hose which completes the fluid conduit with other engine parts.

The throttle modulator body 22 is preferably made of aluminum or a thermoset phenolic resin capable of withstanding the adverse effects of high temperature automotive fluids. Similarly, thermoplastic fluid direction tube 10 with end tube portion 12, press ring 16, press wings 18 and 18', 90° bend 30, discharge tube portion 32 and hose connector 34 is preferably injection molded in one piece from a thermoplastic material having a heat softening temperature of at least 180° C. so as to withstand the high temperature automotive fluids. Preferably, the thermoplastic material must also withstand the heat of an automotive engine which can reach 180° C.

Preferred thermoplastic materials are glass filled polyester resins such as Valox 420 resin from General Electric and glass filled polyetherimide resins such as Ultem 2000 series resin also from General Electric. Both are thermoplastic resins having high heat resistance, dimensional stability in harsh environments, low moisture absorption, good strength and modulus, and are processable on conventional molding equipment.

The reported physical characteristics for Valox 420 resin are as follows:

| Property | SI Units | ASTM Test Method | VALOX 420 resin 30% Glass reinforced |
|---|---|---|---|
| Physical | | | |
| Specific Gravity | | D792 | 1.53 |
| Specific Volume | in³ lb (cm/kg) | — | 18.2 (655) |
| Water Absorption, 24 hours | % | D570 | 0.06 |
| Mold Shrinkage | in/in × 10⁻³ mm/mm × 10⁻³ | | |
| (Flow Direction) | 30–90 mil (.76–2.3 mm) | | 4–6 |
| | 90–180 mil (2.3–4.6 mm) | | 6–7 |
| (Cross Flow Direction) | 30–90 mil (.76–2.3 mm) | | 5–8 |
| | 90–180 mil (2.3–4.6 mm) | | 8–10 |
| Mechanical | | | |
| Tensile Strength | psi (MPa) | D638 | 17,300 (119) |
| Elongation at Break | % | D638 | 3 |
| Flexural Strength | psi (MPa) | D790 | 27,500 (189) |
| Flexural Modulus | psi (MPa) | D790 | 1,100,000 (7,600) |

-continued

| Property | SI Units | ASTM Test Method | VALOX 420 resin 30% Glass reinforced |
|---|---|---|---|
| Compressive Strength | psi (MPa) | D695 | 18,000 (124) |
| Shear Strength | psi (MPa) | D732 | 8,900 (61) |
| Izod Impact Strength | | D256 | |
| Notched, ⅛" thick (3.2 mm) | ft-lb/in (J/m) | | 1.6 (85) |
| Unnotched ⅛" thick (3.2 mm) | ft-lb/in (J/m) | | |
| Gardner impact, ⅛" thick (3.2 mm) | ft-lb (J) | Falling Dart | 15 (800) |
| Rockwell Hardness R-scale | | D785 | 118 |
| Thermal | | | |
| Heat Deflection Temperature | | D648 | |
| @ 66 psi (.46 MPa) | °F. (°C.) | | 420 (215) |
| @ 264 psi (1.82 MPa) | °F. (°C.) | | 405 (207) |
| Coeff. of Thermal Expansion | | D696 | |
| Mold Direction × $10^{-6}$ | in/in/°F. | | |
| Range: | | | |
| −40–100° F. (−40–40° C.) | (m/m/°C.) | | 1.4 (2.5) |
| Range: | | | |
| 140–280° F. (60–140° C.) | | | 1.4 (2.5) |

The reported physical characteristics for Ultem 2000 series resin are as follows:

| Property | ULTEM 2200 Resin |
|---|---|
| Physical | |
| Specific Gravity | 1.42 |
| Mold Shrinkage (cross flow) | 0.003–0.005 |
| Water Absorption | |
| 24 hours, 73° F. (23° C.) | 0.19 |
| Equilibrium, 73° F. (23° C.) | 1.10 |
| Mechanical | |
| Tensile Strength, Yield | 20,100 (140) |
| Tensile Modulus, 1% Secant | 1,000,000 (6,900) |
| Tensile Elongation, Yield | — |
| Tensile Elongation, Ultimate | 3 |
| Flexural Strength | 30,000 (210) |
| Flexural Modulus, Tangent | 900,000 (6,200) |
| Compressive Strength | 28,700 (200) |
| Compressive Modulus | 809,000 (5,600) |
| Izod Impact Strength | |
| Notched, ⅛" (3.2 mm) | 1.5 (90) |
| Unnotched, ⅛" (3.2 mm) | 9.0 (480) |
| Shear Strength, Ultimate | 13,500 (95) |
| Rockwell Hardness | M114 |
| Thermal | |
| Deflection Temperature, Unannealed | |
| @ 66 psi, ¼" (0.45 MPa, 6.4 mm) | 410 (210) |
| @ 264 psi, ¼" (1.82 MPa, 6.4 mm) | 408 (209) |
| Vicat Softening Point, Method B | 428 (226) |
| Thermal Index, UL Bulletin 746B | 338 (170) |
| Coefficient of Thermal Expansion, 0 to 300° F. (−18 to 150° C.), Mold Direction | $1.4 \times 10^{-5}$ ($2.5 \times 10^{-5}$) |
| Flammability | |
| Vertical Burn, UL Bulletin 94 | |
| @ 0.016" (0.41 mm) | V-O |
| @ 0.010" (0.25 mm) | |
| NBS Smoke, Flaming Mode, 0.060" (1.5 mm) | |
| $D_3$ @ 4 min | 1.3 |
| $D_{max}$ @ 20 min | 27 |
| Oxygen Index | 50 |
| Electrical | |
| Dielectric Strength, 1/16" (1.6 mm) | |
| in oil | 670 (26.5) |
| in air | — |
| Dielectric Constant @ 1 kHz, 50% RH | 3.5 |
| Dissipation Factor | |
| 1 kHz, 50% RH, 73° F. (23° C.) | 0.0015 |
| 2450 MHz, 50% RH, 73° F. (23° C.) | 0.0049 |
| Volume Resistivity, 1/16" (1.6 mm) | $7.0 \times 10^{16}$ ($7.0 \times 10^{14}$) |
| Arc Resistance | 85 |

Tables I and II below set forth the various percents retention of tensile strength of a thermoplastic air by-pass tube made of Valox 420 after exposure to several automotive type fluids for 30 and 90 days.

TABLE I

| Media | Immersion Days | Temperature (°C.) | VALOX 420% retention of tensile strength |
|---|---|---|---|
| Transmission Fluid | 30 | 25 | 100 |
| | 90 | 25 | 100 |
| | 30 | 121 | 100 |
| | 90 | 121 | 80 |
| Power Steering Fluid | 30 | 25 | 100 |
| | 90 | 25 | 100 |
| | 30 | 60 | 100 |
| | 90 | 60 | 100 |
| Brake Fluid | 30 | 25 | 100 |
| | 90 | 25 | 100 |
| | 30 | 60 | 100 |
| | 90 | 60 | 98 |
| Amoco Regular | 30 | 25 | 100 |
| | 90 | 25 | 100 |
| | 30 | 60 | 93 |
| | 90 | 60 | 90 |
| Amoco Premium | 30 | 25 | 100 |
| | 90 | 25 | 100 |
| | 30 | 60 | 90 |
| | 90 | 60 | 85 |
| Amoco Unleaded | 30 | 25 | 95 |
| | 90 | 25 | 95 |
| | 30 | 60 | 86 |
| | 90 | 60 | 82 |

TABLE I-continued

| Media | Immersion Days | Temperature (°C.) | VALOX 420% retention of tensile strength |
|---|---|---|---|
| Gasohol (90/10) | 30 | 25 | 95 |
| | 90 | 25 | 95 |
| | 30 | 60 | 79 |
| | 90 | 60 | 79 |
| Diesel Fuel | 30 | 25 | 100 |
| | 90 | 25 | 100 |
| | 30 | 60 | 100 |
| | 90 | 60 | 100 |

TABLE II

| Media | Immersion Days | Temperature (°C.) | VALOX 420% retention of tensile strength |
|---|---|---|---|
| Heptane | 30 | 25 | 99 |
| | 90 | 25 | 99 |
| Acetone | 30 | 25 | 86 |
| | 90 | 25 | 74 |
| Methylethylketone | 30 | 25 | 90 |
| | 90 | 25 | 80 |
| Ethyl acetate | 30 | 25 | 96 |
| | 90 | 25 | 86 |
| Methylene Chloride | 30 | 25 | 54 |
| | 90 | 25 | 54 |
| Ethylene glycol | 30 | 25 | 100 |
| | 90 | 25 | 100 |
| Motor Oil | 30 | 25 | 100 |
| | 90 | 25 | 100 |
| | 30 | 121 | 96 |
| | 90 | 482 | 63 |

It is evident from Tables I and II that the VALOX 420 thermoplastic resin is immune to most automotive related fluids, even at elevated temperatures. Similar immunity is shown by the Ultem 2000 series resins.

Referring now to FIG. 2, a cross-sectional view of the thermoplastic fluid direction tube 10 is taken along line 2—2 of FIG. 1. Reference is also made to FIG. 3 which is a side plan view of the thermoplastic fluid direction tube 10. The press ring 16 is located around the outside and further, press wings 18 and 18' are shown to be symmetrically located along a horizontal axis. The end tube portion 12 is concentrically located inside press ring 16. It is preferable to have the thickness of press ring 16 at least as thick as end tube portion 12.

The high temperature automotive fluids and gases flow through the hollow portion interior of the thermoplastic fluid direction tube 10 from the throttle modulator assembly 20 to a hose (not shown) connected to discharge tube portion 32 by hose connector 34.

The preferred method of making the thermoplastic fluid direction tube 10 is to contemporaneously mold all the elements in a single-shot injection mold. More specifically, the longitudinal, annular and hollow end tube portion 12, press ring 16, the press wings 18 and 18', 90° bend 30, discharge tube portion 32 and hose connector 34 should be molded using a thermoplastic material which exhibits a coefficient of thermal expansion of about the same as the throttle modulator body 22.

Having thus described the throttle modulator assemblies and thermoplastic fluid direction tubes of the present invention in detail and by reference to a preferred embodiment thereof, it will be apparent that certain modifications and variations are possible without departing from the scope of the invention defined in the appended claims.

What is claimed is:

1. A throttle modulator assembly for an automobile engine comprising:
    a) a throttle modulator body having a wall,
    b) at least one bore formed in said wall of said throttle modulator body, and
    c) a thermoplastic fluid direction tube having an end tube portion being press fit into said bore, said thermoplastic fluid direction tube comprising an annular and hollow thermoplastic tube capable of directing the flow of fluids from the throttle modulator toward other parts of said automobile engine, said thermoplastic tube further includes an annular press ring located around said thermoplastic tube and extending radially outward therefrom at a spaced point on said end tube portion, and at least one press wing extending radially outward from said thermoplastic tube and extending axially beyond said press ring along the longitudinal dimension of said thermoplastic tube, said thermoplastic tube having a coefficient of thermal expansion about the same as that of said throttle modulator body.

2. The throttle modulator assembly of claim 1 wherein said wall has a chamfer at the entrance to said bore and wherein said thermoplastic tube has an end tube portion which is inserted into said bore and which has a corresponding chamfer on it.

3. The throttle modulator assembly of claim 1 wherein the outer diameter of said thermoplastic tube is slightly greater than the diameter of said bore.

4. The throttle modulator assembly of claim 1 wherein said throttle modulator body is aluminum.

5. The throttle modulator assembly of claim 4 wherein said thermoplastic tube is made of mineral/glass reinforced thermoplastic material.

6. The throttle modulator assembly of claim 5 wherein said mineral/glass reinforced thermoplastic material is selected from the group consisting of glass reinforced thermoplastic polyester resins and glass reinforced polyetherimide resins;

7. The throttle modulator assembly of claim 1 wherein said thermoplastic tube has an angular bend in it followed by a discharge tube portion.

8. The throttle modulator assembly of claim 7 wherein said discharge tube portion has a hose connector at the end thereof.

9. A thermoplastic fluid direction tube for insertion into a throttle modulator body comprising:
    a) a thermoplastic fluid tube which is annular and hollow and which is made from a thermoplastic material having a coefficient of thermal expansion about the same as that of the throttle modulator body, said thermoplastic tube having an end tube portion sized for insertion into a bore in a throttle modulator body,
    b) an annular press ring located around said thermoplastic tube and extending radially outward therefrom at a spaced point on said end tube portion, and
    c) at least one press wing extending radially outward from said thermoplastic tube and extending axially beyond said press ring along the longitudinal dimension of said thermoplastic tube.

10. The thermoplastic fluid direction tube of claim 9 wherein said thermoplastic tube has an angular bend in it.

11. The thermoplastic fluid direction tube of claim 10 wherein said angular bend is followed by a discharge tube portion.

12. The thermoplastic fluid direction tube of claim 11 wherein said discharge tube portion has a hose connector at the end thereof.

13. The thermoplastic fluid direction tube of claim 9 wherein said thermoplastic tube has a cross-sectional thickness at least as thick as said press ring.

14. The thermoplastic fluid direction tube of claim 9 wherein said thermoplastic material has a coefficient of thermal expansion of about 2.5 m/m/°C. for a temperature range from about −40° C. to about 140° C.

15. The thermoplastic fluid direction tube of claim 9 wherein said thermoplastic tube is made of mineral/glass reinforced thermoplastic material.

16. The thermoplastic fluid direction tube of claim 15 wherein said mineral/glass reinforced thermoplastic material is selected from the group consisting of glass reinforced thermoplastic polyester resins and glass reinforced polyetherimide resins.

17. The thermoplastic fluid direction tube of claim 9 wherein said thermoplastic tube has a chamfer at the open end of said end tube portion and two press wings.

18. A thermoplastic fluid direction tube comprising:
 a) a thermoplastic tube which is annular and hollow, said thermoplastic tube having an end tube portion with a chamfer at the open end thereof, said end tube portion being followed by an angular bend in said thermoplastic tube, followed by a discharge tube portion with a hose connector at the end thereof,
 b) an annular press ring made from the same thermoplastic material as said thermoplastic tube located around said thermoplastic tube and extending radially outward therefrom at a spaced point on said end tube portion, and
 c) two press wings extending radially outward from said thermoplastic tube and axially beyond said press ring and along the longitudinal dimension of said thermoplastic tube.

19. A throttle modular assembly for an automobile engine comprising:
 a) an aluminum throttle modulator body having a wall,
 b) at least one bore formed in said wall of said throttle modulator body,
 c) a thermoplastic fluid direction tube made from mineral/glass reinforced thermoplastic material and press fit into said bore, said thermoplastic fluid direction tube comprising an annular and hollow thermoplastic tube capable of directing the flow of fluids from the throttle modulator body toward other parts of said automobile engine, said thermoplastic tube having a coefficient of thermal expansion about the same as that of said throttle modulator body,
 d) an annular press ring located around said thermoplastic tube and extending radially outward therefrom at a spaced point on said end tube portion, and
 e) two press wings each extending radially outward from said thermoplastic tube and axially beyond said press ring along the longitudinal dimension of said thermoplastic tube.

20. A throttle modulator assembly for an automobile engine comprising:
 a) an aluminum throttle modulator body having a wall,
 b) at least one bore formed in said wall of said throttle modulator body,
 c) a thermoplastic fluid direction tube made from mineral/glass reinforced thermoplastic material and press fit into said bore, said thermoplastic fluid direction tube comprising an annular and hollow thermoplastic tube capable of directing the flow of fluids from the throttle modulator body toward other parts of said automobile engine, said thermoplastic tube having a coefficient of thermal expansion about the same as that of said throttle modulator body, and
 d) an annular press ring located around said thermoplastic tube and extending radially outward therefrom at a spaced point on said end tube portion, said press ring being made from said mineral/glass reinforced thermoplastic material.

* * * * *